(12) United States Patent
Aulin et al.

(10) Patent No.: US 10,781,914 B2
(45) Date of Patent: Sep. 22, 2020

(54) METHOD OF CONTROLLING A DRIVE TRAIN

(71) Applicant: BorgWarner Sweden AB, Landskrona (SE)

(72) Inventors: Hans Aulin, Malmö (SE); Johan Nilsson, Prague (CZ)

(73) Assignee: BORGWARNER TORQTRANSFER SYSTEMS AB, Landskrona (SE)

( * ) Notice: Subject to any disclaimer, the term of this patent is extended or adjusted under 35 U.S.C. 154(b) by 224 days.

(21) Appl. No.: 15/753,453

(22) PCT Filed: Aug. 31, 2016

(86) PCT No.: PCT/EP2016/070483
§ 371 (c)(1),
(2) Date: Feb. 19, 2018

(87) PCT Pub. No.: WO2017/037099
PCT Pub. Date: Mar. 9, 2017

(65) Prior Publication Data
US 2018/0238443 A1 Aug. 23, 2018

(30) Foreign Application Priority Data
Aug. 31, 2015 (SE) ..................................... 1551126

(51) Int. Cl.
*F16H 61/04* (2006.01)
*B60K 6/485* (2007.10)
(Continued)

(52) U.S. Cl.
CPC ........... *F16H 61/0403* (2013.01); *B60K 6/26* (2013.01); *B60K 6/365* (2013.01); *B60K 6/387* (2013.01); *B60K 6/405* (2013.01); *B60K 6/485* (2013.01); *B60K 6/547* (2013.01); *B60K 11/02* (2013.01); *B60W 10/06* (2013.01); *B60W 10/08* (2013.01); *B60W 10/115* (2013.01); *B60W 20/40* (2013.01); *F16H 3/54* (2013.01); *F16H 57/0454* (2013.01); *F16H 57/05* (2013.01); *B60K 2006/268* (2013.01); *B60K 2006/4841* (2013.01); *B60W 2510/0638* (2013.01);
(Continued)

(58) Field of Classification Search
CPC ..................... F16H 2061/0422; F16H 61/0403
See application file for complete search history.

(56) References Cited

U.S. PATENT DOCUMENTS 9,463,687 B2 * 10/2016 Kaltenbach ............ B60K 6/365
2010/0311540 A1 12/2010 Hellenbroich
2012/0220403 A1 8/2012 Reichert et al.

FOREIGN PATENT DOCUMENTS

DE 102011080522 A1 2/2013
WO WO-2014075853 A1 * 5/2014 ............ B60W 10/06

* cited by examiner

*Primary Examiner* — Erin D Bishop
(74) *Attorney, Agent, or Firm* — Young Basile Hanlon & MacFarlane, P.C.

(57) ABSTRACT

A method of controlling a drive train comprising an electric motor (12), a gearbox (1) and an internal combustion engine (13). The gearbox (1) is placed between the electric motor (12) and the internal combustion engine (13) in the drive train. The speed of the electric motor (12) is synchronized to the speed of the internal combustion engine (13) in order to shift the gearbox. The gearbox (1) is shifted between different operation modes by means of controlling the position of a dog clutch (6).

21 Claims, 2 Drawing Sheets

(51) Int. Cl.
  *B60K 6/387*      (2007.10)
  *B60K 6/405*      (2007.10)
  *F16H 57/04*      (2010.01)
  *F16H 57/05*      (2006.01)
  *B60K 6/26*       (2007.10)
  *B60K 6/365*      (2007.10)
  *B60K 6/547*      (2007.10)
  *B60K 11/02*      (2006.01)
  *B60W 10/06*      (2006.01)
  *B60W 10/08*      (2006.01)
  *B60W 10/115*     (2012.01)
  *B60W 20/40*      (2016.01)
  *F16H 3/54*       (2006.01)
  *B60K 6/48*       (2007.10)

(52) U.S. Cl.
  CPC .......... *B60W 2510/081* (2013.01); *B60W 2710/0644* (2013.01); *B60W 2710/081* (2013.01); *B60W 2710/1005* (2013.01); *B60Y 2200/92* (2013.01); *F16H 2061/0422* (2013.01); *F16H 2200/0034* (2013.01); *F16H 2200/2005* (2013.01); *F16H 2200/2064* (2013.01); *F16H 2200/2094* (2013.01); *Y10S 903/91* (2013.01); *Y10S 903/919* (2013.01); *Y10S 903/93* (2013.01); *Y10S 903/945* (2013.01)

METHOD OF CONTROLLING A DRIVE TRAIN

This application claims the benefit of Swedish Application No. 1551125-6 filed Aug. 31, 2015, and PCT Application No. EP2016/070483 filed Aug. 31, 2016.

TECHNICAL FIELD

The present invention concerns a control strategy for a drive train of a vehicle.

BACKGROUND

A drive train of a vehicle can have different structures. One example is that the drive train comprises an internal combustion engine, an electric motor and a gearbox placed between the internal combustion engine and the electric motor.

In gearboxes it is common to use synchronizing rings in order to shift gear ratios. Without the use of synchronizing rings the speed of the gear wheels to be connected must be synchronized. This invention is directed to drive trains where the gearboxes placed between an internal combustion engine and an electric motor has no synchronizing rings.

SUMMARY

The present invention is directed to a method of controlling a drive train comprising an electric motor, a gearbox and an internal combustion engine. The gearbox is placed between the electric motor and the internal combustion engine in the drive train. The speed of the electric motor is synchronized with the speed of the internal combustion engine in order to shift the gearbox.

The synchronization of the speed of the electric motor is needed in order to shift the gearbox.

In the shown embodiment a dog clutch is moved between three positions by means of a shift fork. The three positions of the dog clutch give a high ratio, neutral and direct drive, respectively. In the neutral position the electric motor is disconnected. In the direct drive the ratio of the gearbox is 1:1. The dog clutch has teeth for cooperation with gear wheels of the gearbox. In shifting the dog clutch is moved into and out of mesh with gear wheels of the gearbox.

By using the electric motor for torque fill during transients the amount of $NO_x$ and $CO_2$ is reduced. Further, soot production is reduced, improved acceleration is given and higher extent of downsizing is allowed. In that energy is regenerated during braking, energy that otherwise would have been wasted is stored.

Further objects and advantages of the present invention will be obvious to a person skilled in the art when reading the detailed description below.

BRIEF DESCRIPTION OF THE DRAWINGS

The invention will be described further below by way of example and with reference to the enclosed drawings. In the drawings.

DETAILED DESCRIPTION

Figure 1A:
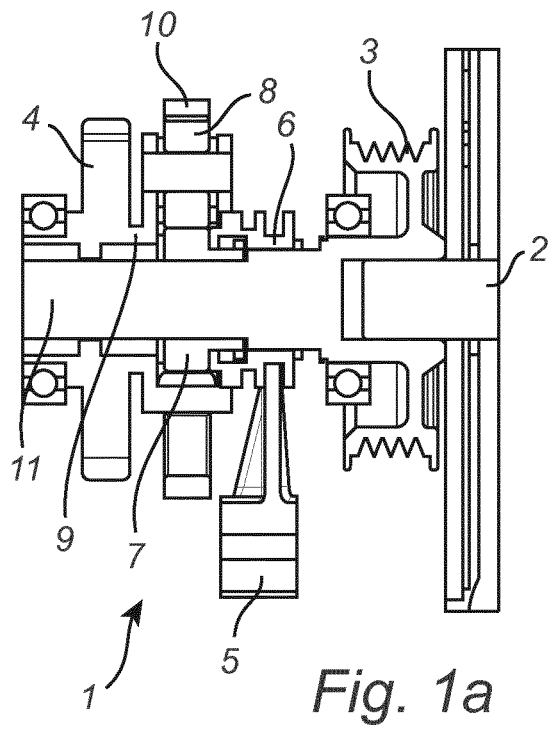
FIGS. 1a to 1c are cross sections of one example of a gearbox in three different operation modes, which gearbox can be used with the method of the present invention.

In the shown embodiment a gearbox 1 is placed on an output shaft 2 of an electric motor 12. A wheel 3 is placed on said output shaft 2 for connection by means of bands or chains to an AC (air condition) 14 and/or a water pump 15. A clutch 17 is placed between a damper 16 and a gear wheel 18 on the output side of the internal combustion engine 13. The clutch 17 makes it possible to use the invention for P2 hybrids. Removal of the clutch 17 would make the invention applicable for P0 and P1 hybrids. As is known, for P0 and P1 hybrids the electric motor 12 is placed directly at the internal combustion engine 13 on either side of the internal combustion engine 13 and for P2 hybrids the electric motor 12 is placed on the input shaft of the gearbox 1. In some embodiments (P0 and P1) there is no clutch 17 placed between the damper 16 and the gear wheel 18.

The gearbox 1 comprises a planetary gear set and a gear wheel 4 for connection to an internal combustion engine 13. The gearbox 1 further comprises a dog clutch 6 which is moved by means of a shift fork 5 into different positions. The dog clutch 6 has rings with outer teeth for meshing with different parts of the planetary gear set.

The planetary gear set comprises a sun gear 7, planet gears 8 supported by a carrier 9 and an annular gear 10. The carrier 9 of the planetary gear set is mechanically fixed to the gear wheel 4 for connection to the internal combustion engine 13.

The output shaft 2 of the electric motor 12 is drivingly connected to a further shaft 11, in line with the output shaft 2. The dog clutch 6 is drivingly connected to the further shaft 11 and is displaceable along the further shaft 11 by means of splines.

By using chains rather then the commonly used belts for transfer of torque to and from the internal combustion engine 13 it is possible to transfer relatively high torques. It is also possible to use the electric motor 12 as the starting motor, obviating the need of a separate starting motor.

Figure 1B:
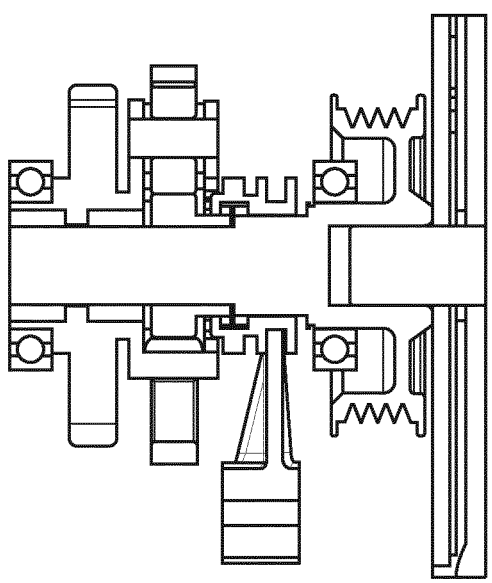
Figure 1C:
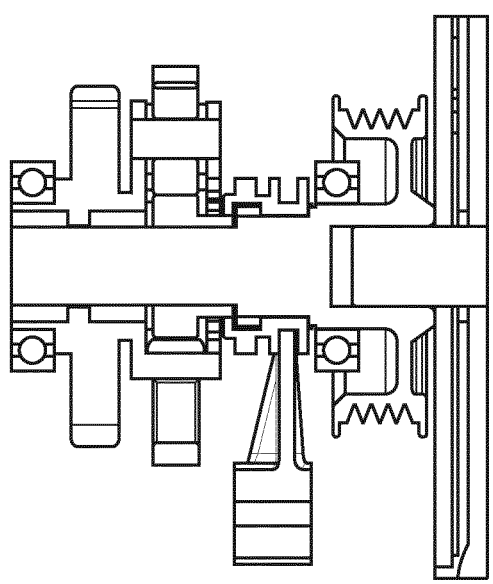
Figure 2:
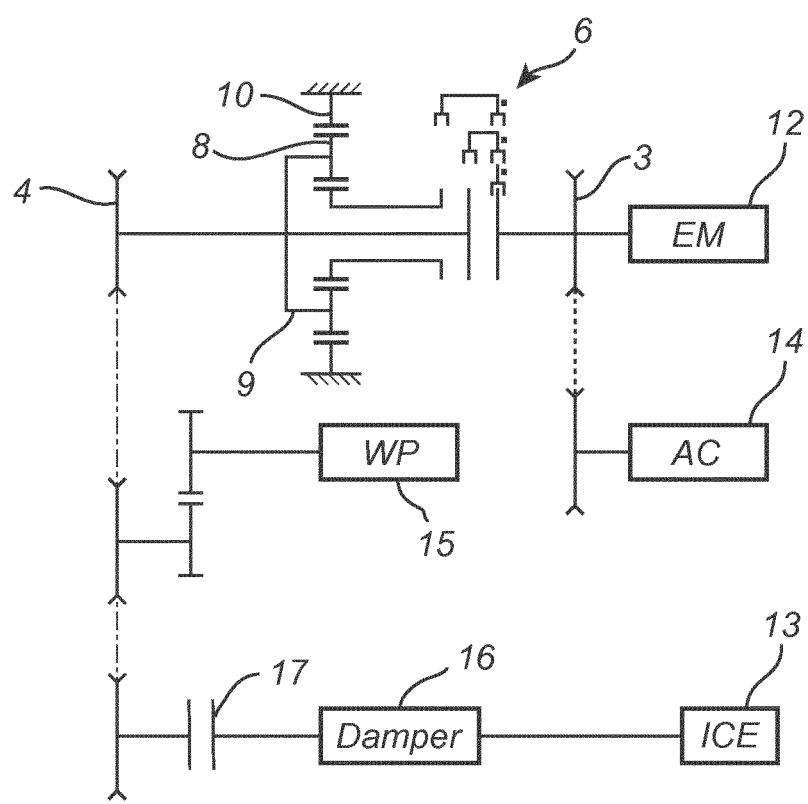
FIG. 2 is a schematic representation of a driveline in which the method of the present invention can be used.

In FIG. 2 three possible positions of the dog clutch 6 are indicated, giving three different operation modes. In FIGS. 1a to 1c the position of the dog clutch 6 is shown in the three different operation modes.

As stated above the gearbox has three different operation modes. With the dog clutch 6 moved to the right, as shown in FIG. 1c, the dog clutch 6 is in mesh with the sun gear 7 of the planetary gear set. In said operation mode there is a high ratio between the electric motor 12 and the internal combustion engine 13. The ratio depends on the relationship between the different gear wheels of the planetary gear set. This operation mode could also be called cranking mode.

With the dog clutch 6 in a middle position, as shown in FIG. 1b, the gearbox is in a neutral operation mode. In the neutral operation mode the dog clutch 6 is moved out of contact with any gear wheels of the planetary gear set. Thus, there is no driving contact between the electric motor 12 and the internal combustion engine 13.

With the dog clutch 6 moved to the left, as shown in FIG. 1a the dog clutch 6 is in mesh with the carrier 9 of the planetary gear set. As the gear wheel 4 for connection to the internal combustion engine 13 is mechanically fixed to the carrier 9, said gear wheel 4 will rotate with the speed of the output shaft 2 of the electric motor 12. In this operation mode there is a ratio of 1:1 between the electric motor 12 and the internal combustion engine 13. This operation mode is the normal driving mode.

As indicated above, when moving the dog clutch 6 between its three different positions the speed of the electric motor 12 and the internal combustion engine 13 must be synchronized, in order to move the dog clutch 6 into and out of driving contact with the sun gear 7 or the carrier 9, respectively, of the planetary gear set. For the synchronizing, sensors are used to sense the speed of the internal combustion engine 13 and the electric motor 12, respectively. The synchronizing is made by adjusting the speed of the electric motor 12.

At start up the dog clutch 6 is moved to the cranking mode, giving a high ratio. At start up the electric motor 12 applies torque until the internal combustion engine 13 starts. Thus, the electric motor 12 will act as the starting motor. The AC 14 is disconnected in the start up phase. When the internal combustion engine 13 has started the electric motor 12 is adjusted to follow the speed of the internal combustion engine 13. When the speed of the electric motor 12 is adjusted to the speed of the internal combustion engine 13, the electric motor 12 is to transfer no torque. When no torque is transferred the dog clutch 6 is moved to the neutral operation mode. The electric motor 12 should not transfer any torque in order to be able to shift the position of the dog clutch 6. With the dog clutch 6 in neutral the internal clutch of the AC 14 is still disconnected. The speed of the electric motor 12 is then decreased to match the lower gear ratio. When the speed of the electric motor 12 is synchronized the dog clutch 6 is moved into the normal operation mode. This ends the start up phase. In simulations, start up times well below 300 ms have been achieved.

Using the high ratio of the cranking mode allows for cold starts. The gear ratio needed for cold starts of a typical internal combustion engine vary depending on the electric motor, but should be between 1:6 and 1:8 for a motor capable of achieving 30 to 50 Nm.

During the normal operation mode the electric motor 12 can be used to add torque during transients. Further, at braking the electric motor 12 can be used to regenerate energy. The electric motor 12 is also used to charge the battery, if the battery has a low state of charge. In the normal operation mode the AC 14 is allowed.

In the neutral operation mode the electric motor 12 is disconnected from the internal combustion engine 13, this will reduce drag losses.

By disconnecting the clutch 18 on the output side of the internal combustion engine 13, it is possible to drive the vehicle with use of only the electric motor 12.

The electric motor 12 can operate the AC 14 without the internal combustion engine 13 running. This can be used to cool down the vehicle before entering, giving a "cool welcome" for the driver and passengers. The electric motor 12 can also operate the water pump 15 used for cooling of both the electric motor 12 and the internal combustion engine 13. The electric motor 12 can operate the water pump 15 also after the internal combustion engine 13 has been turned off in order to cool down the internal combustion engine 13. Thus, no extra circulation pump is needed.

The high gear ratio provides high start up torque also with limited battery charge.

The invention claimed is:

1. A method of controlling a drive train comprising an electric motor and an internal combustion engine, which drive train further comprises a gearbox placed between the electric motor and the internal combustion engine in the drive train, characterized in that the speed of electric motor is synchronized to the speed of the internal combustion engine in order to shift the gearbox, wherein the gearbox is shifted between different operation modes by means of controlling the position of a dog clutch, and wherein the dog clutch is moved to give the different operation modes, being a high ratio or cranking mode, a neutral mode and a normal mode, wherein in the neutral mode there is no connection between the electric motor and the internal combustion engine, and wherein in the normal mode the ratio of the gearbox is 1:1, and wherein in the high ratio mode the ratio of the gearbox is set high enough to accomplish cold start.

2. The method of claim 1, wherein at start up the gearbox is placed in the cranking mode and the electric motor is used as a starting motor by applying torque until the internal combustion engine starts, wherein in a following step the electric motor is adjusted to follow the speed of the internal combustion engine without transferring any torque and wherein in a further following step the gearbox is put into the neutral operation mode by altering the position of the dog clutch.

3. The method of claim 2, wherein the speeds of the electric motor and the internal combustion engine are monitored by means of sensors.

4. The method of claim 2, wherein the electric motor is adjusted to not transfer any torque when moving the dog clutch into and out of mesh with different elements of the gearbox.

5. The method of claim 2, wherein the electric motor is used to add torque during transients of the internal combustion engine in the normal operation mode.

6. The method of claim 2, wherein the gearbox is placed in the normal operation mode to be able to increase the torque transferred of the drive train or to be able to drive the electric motor as a generator.

7. The method of claim 2, wherein the dog clutch is controlled to move the gearbox into the neutral operation mode in-between gear changes.

8. The method of claim 2, wherein an air conditioner is run by means of the electric motor, independently of if the internal combustion engine is running or not.

9. The method of claim 8, wherein the air conditioner is disconnected during start up.

10. The method of claim 2, wherein the electric motor is controlled to run a water pump cooling down the internal combustion engine also after the internal combustion engine has been turned off.

11. The method of claim 1, wherein a clutch placed between the internal combustion engine and the gearbox is disconnected to only use the electric motor or wherein teeth of the dog clutch are moved into and out of mesh with elements of a planetary gear set of the gearbox at shifting of the gearbox.

12. A method of controlling a drive train comprising an electric motor and an internal combustion engine, which drive train further comprises a gearbox placed between the electric motor and the internal combustion engine in the drive train, characterized in that the speed of electric motor is synchronized to the speed of the internal combustion engine in order to shift the gearbox, wherein the gearbox is shifted between different operation modes by means of controlling the position of a dog clutch, wherein teeth of the dog clutch are moved into and out of mesh with elements of a planetary gear set of the gearbox at shifting of the gearbox, and wherein the dog clutch is moved to give the different operation modes, being a high ratio or cranking mode, a neutral mode and a normal mode, wherein in the neutral mode there is no connection between the electric motor and the internal combustion engine, and wherein in the normal mode the ratio of the gearbox is 1:1, wherein at start up the gearbox is placed in the cranking mode and the electric motor is used as a starting motor by applying torque until the internal combustion engine starts, wherein in a following step the electric motor is adjusted to follow the speed of the internal combustion engine without transferring any torque and wherein in a further following step the gearbox is put into the neutral operation mode by altering the position of the dog clutch.

13. The method of claim 12, wherein in the high ratio mode the ratio of the gearbox is set high enough to accomplish cold start.

14. The method of claim 12, wherein the speeds of the electric motor and the internal combustion engine are monitored by means of sensors.

15. The method claim 12, wherein the electric motor is adjusted to not transfer any torque when moving the dog clutch into and out of mesh with different elements of the gearbox.

16. The method of claim 12, wherein the electric motor is used to add torque during transients of the internal combustion engine in the normal operation mode.

17. The method of claim 12, wherein the gearbox is placed in the normal operation mode to be able to increase the torque transferred of the drive train or to be able to drive the electric motor as a generator.

18. The method of claim 12, wherein the dog clutch is controlled to move the gearbox into the neutral operation mode in-between gear changes.

19. The method of claim 12, wherein an air conditioner (AC) is run by means of the electric motor, independently of if the internal combustion engine is running or not, wherein optionally the AC is disconnected during start up.

20. The method claim 12, wherein the electric motor is controlled to run a water pump cooling down the internal combustion engine also after the internal combustion engine has been turned off.

21. The method claim 12, wherein a clutch placed between the internal combustion engine and the gearbox is disconnected to only use the electric motor.

* * * * *